United States Patent [19]

Klazura

[11] Patent Number: 4,951,527
[45] Date of Patent: Aug. 28, 1990

[54] TRANSMISSION ASSEMBLY

[76] Inventor: Kenneth Klazura, 2810 E. Eaton La., Cudahy, Wis. 53110

[21] Appl. No.: 295,916

[22] Filed: Jan. 11, 1989

[51] Int. Cl.⁵ .............................................. F16H 57/02
[52] U.S. Cl. ...................................... 74/606 R; 74/745
[58] Field of Search ................. 74/606 R, 745 X, 359, 74/740, 375

[56] References Cited

U.S. PATENT DOCUMENTS

| | | | |
|---|---|---|---|
| 4,274,303 | 6/1981 | Shindo et al. | 74/740 |
| 4,302,984 | 12/1981 | Katayama | 74/375 |
| 4,478,593 | 10/1984 | Brown | 74/606 R |
| 4,528,867 | 7/1985 | Semba et al. | 74/359 X |
| 4,610,175 | 9/1986 | Weis et al. | 74/606 R |
| 4,616,478 | 10/1986 | Jensen | 74/606 R X |
| 4,628,768 | 12/1986 | Omura et al. | 74/745 |
| 4,641,547 | 2/1987 | Stich et al. | 74/606 R |
| 4,738,159 | 4/1988 | Kato et al. | 74/606 R |

FOREIGN PATENT DOCUMENTS

| | | | |
|---|---|---|---|
| 0039346 | 4/1981 | Japan | 74/740 |
| 0174758 | 10/1983 | Japan | 74/740 |

OTHER PUBLICATIONS

Hydramatic, THM400, Principles of Operation, Second Edition, Division of General Motors Corp., Ypsilanti, Michigan 48197, 1965, 1968.

*Primary Examiner*—Vinh T. Luong
*Attorney, Agent, or Firm*—Michael, Best & Friedrich

[57] ABSTRACT

A transmission assembly for enhancing the performance of an internal combustion engine or the like, the transmission assembly including a coupling plate mounted between first and second automatic transmissions; a drive shaft disposed in driving relation with the first and second automatic transmssions; and a conduit for providing pressurized transmission fluid communication between the first and second automatic transmissions. Each automatic transmission further has a shifting lever which permits an operator selectively to actuate each transmission in a predetermined fashion, as appropriate, to highway conditions or other operational considerations.

10 Claims, 3 Drawing Sheets

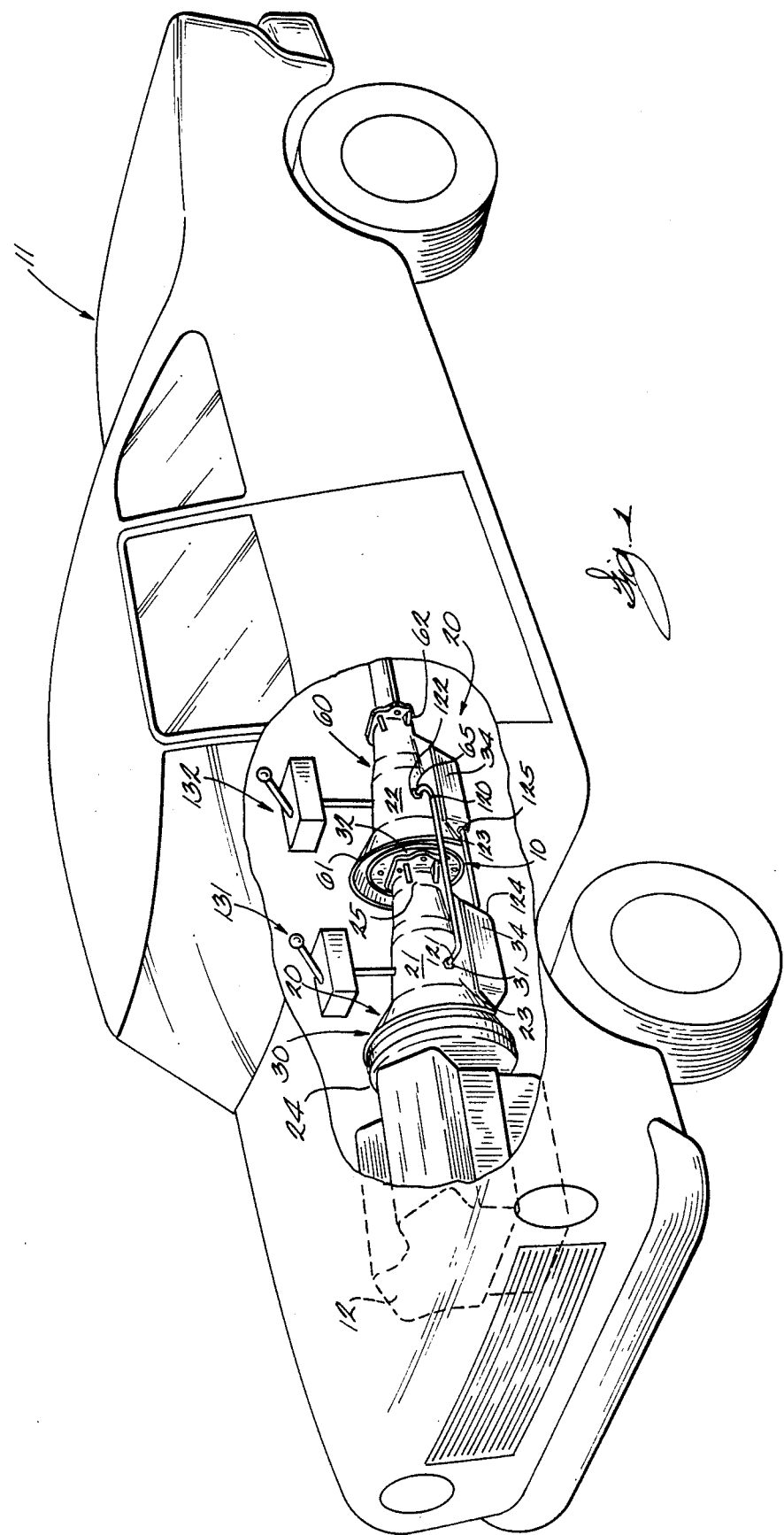

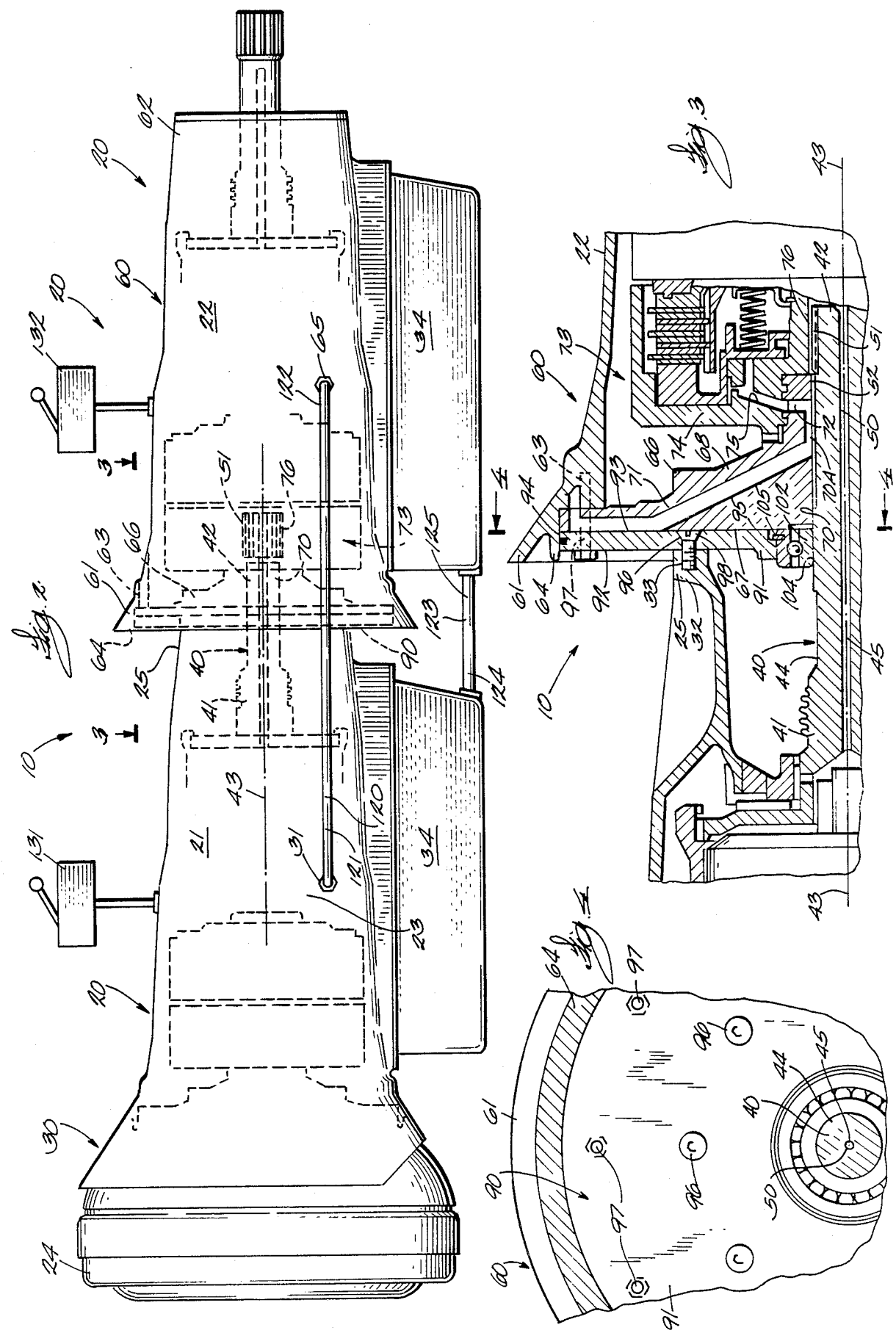

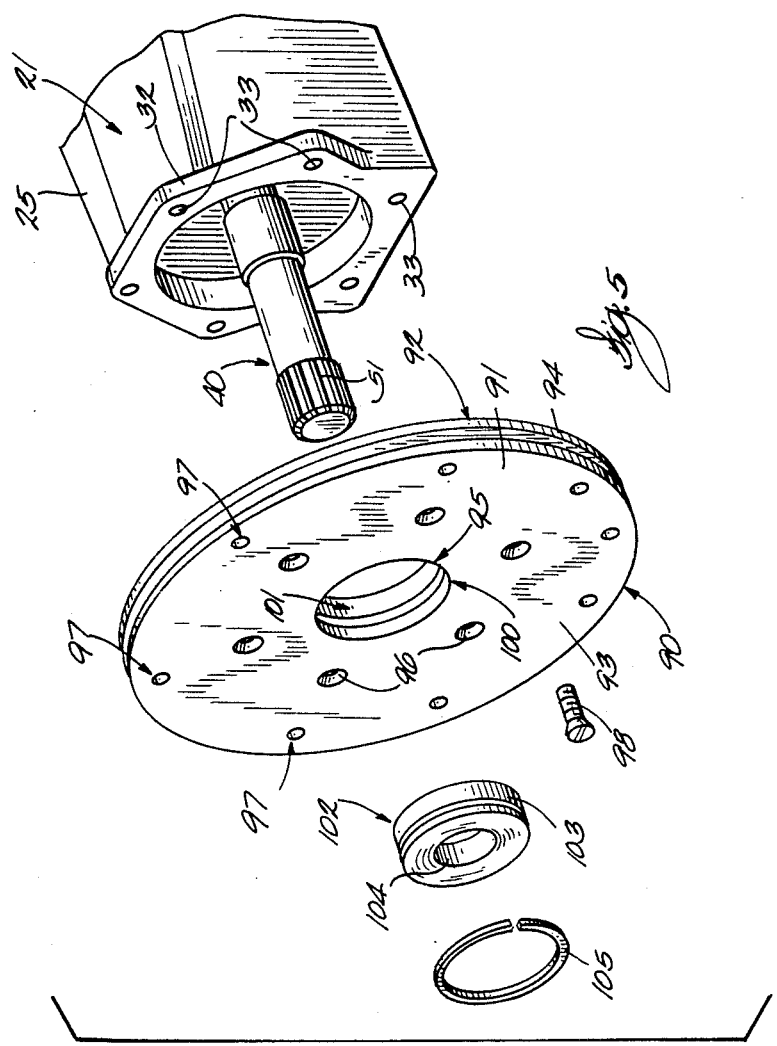

TRANSMISSION ASSEMBLY

BACKGROUND OF THE INVENTION

1. Field of the Invention:

The present invention relates to a transmission assembly for use with an internal combustion engine or the like, and more particularly to such a transmission assembly which has particular utility when employed serially to couple a pair of automatic transmissions in driving relation with the internal combustion engine, the individual transmissions, when selectively actuated under predetermined operating conditions imparting improved performance characteristics to the internal combustion engine which is so equipped.

2. Description of the Prior Art:

The prior art is replete with numerous transmission assemblies which are utilized in combination with an internal combustion engine, and other subassemblies, and which imparts assorted performance characteristics to the vehicle which is so equipped. For the most part, these assorted prior art transmissions work well for the purposes intended. However, significant difficulties may be encountered when vehicles equipped with a particular type of transmission are employed for certain tasks. For example, it has long been an American pasttime to restore vintage automobiles in a fashion such that they may be utilized for both personal use and competitive racing. In this regard, complex changes in the gearing and gear ratios of the differentials and transmissions are usually required to convert a stock component into one which will impart the desired performance characteristics under competitive track conditions. After making such a change in the gearing for track conditions, it should be understood that this same vehicle would probably not perform economically under highway speeds because this gear change would typically cause the engine to labor at higher revolutions per minute, (RPM) thereby decreasing its fuel economy and efficiency. Under these circumstances, operators of such vehicles have faced the dilemma of either changing the gearing to reflect the driving conditions they anticipated, or alternatively dedicating the vehicle exclusively to racing, for example, thereby substantially losing the use and enjoyment of the vehicle for personal purposes.

A similar problem is experienced with respect to the transmissions utilized in larger vehicles such as mobile homes and campers. In this situation the weight of these vehicles demands a particular gear ratio which facilitates the movement of the vehicle from a dead stop. However, this gear ratio does not readily impart fuel efficiency characteristics to the vehicle. For example, under typical highway conditions such large vehicles may have fuel economy levels of less than five (5) miles per gallon (2.13 km/lit). Other vehicles such as four-wheel drives and other similarly related off-road, or utility vehicles have similar characteristics.

Therefore, it has long been known that it would be desirable to have a transmission assembly for use with an internal combustion engine, and which would be operable selectively to impart to the vehicle improved performance characteristics which would have, heretofore, only have been achieved by the selective replacement of predetermined differential gears or other transmission subassemblies, the transmission assembly of the present invention serially coupling a pair of automatic transmissions in driving relation to the internal combustion engine, the individual transmissions thereafter selectively actuated under predetermined operational conditions to achieve the desired performance characteristics for the particular driving conditions.

SUMMARY OF THE INVENTION

It is an object of the present invention to provide an improved transmission assembly.

Another object of the present invention is to provide such a transmission assembly which has particular utility when utilized serially to link a first and second automatic transmission in driving relation with an internal combustion engine, the individual automatic transmissions selectively actuated under predetermined operational conditions thereby imparting improved performance characteristics to the internal combustion engine which is so equipped.

Another object of the present invention is to provide a transmission assembly which includes a coupling plate that is mounted between the rearward portion of the first automatic transmission and the forward portion of the second automatic transmission, the coupling plate defining a centrally disposed bore which receives a bearing that is operable to support a drive shaft for rotatable movement.

Another object of the present invention is to provide such a transmission assembly which includes a means for providing transmission fluid communication between the first automatic transmission and the second automatic transmission, the first automatic transmission providing automatic transmission fluid pressure for use by the second automatic transmission.

Another object of the present invention is to provide a transmission assembly wherein the subassemblies of the second automatic transmission immediately forward of the rearward portion of the stator plate are removed, and discarded, and the coupling plate comformably is dimensioned for mating receipt with the housing of the second automatic transmission.

Another object of the present invention is to provide such a transmission assembly which can be manufactured as an integral subassembly of an automatic transmission or which can be manufactured and sold in the manner of a retrofit.

Another object of the present invention is to provide such a transmission assembly which is readily adaptable to most all models and designs of commercially available automatic transmissions.

Another object of the present invention is to provide such a transmission assembly which permits an operator readily to reconfigure the transmission into a number of different operational configurations to suit any driving conditions or operator preferences.

Another object of the present invention is to provide such a transmission assembly which is relatively simple to operate, and is easily accessed for purposes of maintenance, modification, or the like.

Another object of the present invention is to provide such a transmission assembly which is operable to obtain the individual benefits to be derived from related prior art devices while avoiding the detriments individually associated therewith.

Another object of the present invention is to provide such a transmission assembly which is characterized by its ease of utilization, simplicity of construction, and which can be manufactured, sold, and maintained at a relatively nominal cost.

These and other objects and advantages are achieved in a transmission assembly of the subject invention where, in the preferred embodiment, the transmission assembly includes a first transmission and a second transmission coupled together in series and further including a coupling plate disposed between the first and second automatic transmissions, the coupling plate mounted on the first transmission and the second automatic transmission mounted on the coupling plate; a drive shaft having first and second ends the first end disposed in driving relation with the first automatic transmission, and the second end disposed in driving relation with the forward clutch of the second automatic transmission; a conduit disposed in fluid communication between the first and second automatic transmissions, the conduit providing pressurized transmission fluid communication between the first and second automatic transmissions; and a shifting lever connected to each automatic transmission and operable to permit an operator selectively to actuate each automatic transmission under predetermined operational conditions thereby imparting improved performance characteristics to the internal combustion engine which is so equipped.

BRIEF DESCRIPTION OF THE DRAWINGS

FIG. 1 is a perspective view of the transmission device of the subject invention shown in a typical operative environment where it is installed on an earth traversing vehicle.

FIG. 2 is a fragmentary, side elevation view of the transmission device of the subject invention and showing some underlying structures in hidden lines.

FIG. 3 is a partial, longitudinal, vertical, sectional view of the transmission device of the subject invention taken along line 3—3 of FIG. 2.

FIG. 4 is a fragmentary, side elevation of the transmission device of the subject, invention taken along line 4—4 of FIG. 3.

FIG. 5 is a fragmentary, exploded, perspective view of the transmission device of the subject invention.

DESCRIPTION OF THE PREFERRED EMBODIMENT

Referring more particularly to the drawings, the transmission assembly of the present invention is generally indicated by the numeral 10 in FIG. 1. For illustrative convenience, the apparatus 10 as herein shown and described is depicted as it would be installed on, or retrofitted to, an earth traversing vehicle such as an automobile 11. The automobile 11 has an internal combustion engine 12. It should be readily recognized that the subject invention can be employed on any apparatus which utilizes an internal combustion engine. Further and as earlier discussed, the apparatus can be manufactured as an integral subassembly of an internal combustion engine or alternatively manufactured as a kit and later installed in the manner of a retrofit.

The transmission assembly of the subject apparatus 10 is operable serially to mount a pair of automatic transmissions generally indicated by the numeral 20 and which will hereinafter be designated as a first automatic transmission 21 and a second automatic transmission 22 in driving relation with the engine 12. The individual automatic transmissions utilized are the THM 400 transmissions which are manufactured by Hydra-Matic, a division of General Motors Corporation. The construction and operation of the individual automatic transmissions 20 is illustrated and described in a document entitled "Principles of Operation; Hydramatic THM 400", second edition, published by Hydra-Matic, a division of General Motors Corporation, and this document is incorporated herein by reference. It should also be understood that other commercially available automatic transmissions of substantially similar design could be successfully employed in a similar fashion. The first automatic transmission 21 has a housing which is generally indicated by the numeral 23 and which further has a first end 24 and an opposed second end 25. As best illustrated by reference to FIG. 1, the first end 24 of the housing is fixed using conventional fasteners, not shown, to the internal combustion engine 12 in a fashion well understood by those skilled in the art. Further the housing 23 includes a bell shaped portion 30, the bell shaped portion housing a torque converter and transmission fluid pump, (not shown) both of which are well understood by those skilled in the art. The housing further has a testing port 31. The testing port is usually utilized by maintenance personnel for diagnostic purposes in the nature of measuring transmission fluid pressure in the transmission fluid circuit of the transmission 21. The significance of this test port will hereinafter be discussed in greater detail. A flange generally indicated by the numeral 32 is borne by the housing and disposed at the second end 25 thereof. The flange 32 has a plurality of orifices or threaded channels 33 formed therein, and which are disposed in a predetermined pattern. These individual orifices are adapted to receive a suitable fastener which will hereinafter be discussed in further detail. Each automatic transmission further includes an oil pan which is generally indicated by the numeral 34.

As best illustrated by reference to FIGS. 2 and 3 the first automatic transmission 21 includes a drive shaft which is generally indicated by the numeral 40. The drive shaft 40 includes a first end 41 which is disposed in driving relation with the first automatic transmission, and a second end 42 which is disposed in driving relation with the second automatic transmission 22. The drive shaft 40 has a longitudinal axis which is generally indicated by the line labeled 43, and further has an exterior surface 44, and a central, longitudinally extending bore 45 defines a longitudinally extending passageway 50. The lubricating passageway 50 provides for transmission fluid communication between the first automatic transmission and the second automatic transmission. This relationship is most clearly shown by reference to FIGS. 2 and 3. As most clearly illustrated by reference to FIG. 2, the second end 42 of the drive shaft 40 includes a number of splines 51 which are operable conformably to mate with a splined bore of the forward clutch 73 of the second automatic transmission 22 such that drive shaft 40 drives the forward clutch 73. The forward clutch of the second automatic transmission 22 will hereinafter be discussed in greater detail.

Further and as best illustrated by reference to FIG. 3, a bushing 52 sealingly is mounted on the drive shaft 40 and is disposed in close proximity to the second end 42. This bushing 52 is operable to permit transmission fluid communication between a fluid pressure passage 71 in the stator plate and the forward clutch of the second automatic transmission. The stator plate of the second automatic transmission will also be discussed in greater detail hereinafter.

The second automatic transmission 22 has a housing generally indicated by the numeral 60. The housing 60 has a first end 61 and a second end generally indicated by the numeral 62. As should be understood by a close study of FIGS. 1 and 2, the first end 61 of housing 60 begins in an area in close proximity to the rearwardly disposed portion of the stator plate which will hereinafter be designated by the numeral 66. It should be recognized that all subassemblies of the second transmission immediately forward of the rearwardly disposed portion of the stator plate are removed for purposes of this invention. The first end of the housing 60 further has a plurality of threaded bores 63, only one of which is shown. The individual bores are operable to receive fasteners which will hereinafter be discussed in greater detail. The housing 60, in the immediate vicinity of the first end 61, includes a forwardly facing and substantially annular shaped flange which is generally indicated by the numeral 64. The rearwardly disposed portion of the stator plate 66 is housed in the opening defined by the flange 64 of the housing 60. The housing 60 further has a transmission fluid pressure test port 65. This test port is substantially identical to the test port 31 of the first automatic transmission 21. The stator plate portion 66 has a forwardly facing surface 67 and a generally rearwardly disposed surface that is indicated by the numeral 68. As best seen by reference to FIG. 3, a substantially centrally disposed bore 70 is formed in the stator plate 66 and is operable to house the drive shaft 40. Moreover an enlarged bore portion 70A is formed in the centrally disposed bore. Further the stator plate portion 66 has formed therein first and second fluid passageways which are individually indicated by the numerals 71 and 72, respectively. The first fluid passage 71 communicates in a conventional manner with the transmission fluid circuit of the second transmission. Hydraulic fluid pressure is supplied to the transmission fluid circuit through the test port 65. The first and second fluid passageways 71 and 72, respectively, are disposed in fluid communication with the enlarged bore portion 70A. The first and second fluid passageways 71 and 72 permit transmission fluid to pass through the stator plate and be received by the forward clutch 73 of the second automatic transmission 22. As shown most clearly by reference to FIG. 3 the forward clutch 73 has a main body 74 which has formed therein a fluid passageway 75 which is disposed in fluid communication with the second fluid passageway 72. Further, the forward clutch has a centrally disposed passageway 76 which conformably is dimensioned matingly to receive the splined portion 51 of the drive shaft 40. This relationship is clearly illustrated by reference to the drawings.

The transmission assembly 10 includes a coupling plate which is generally indicated by the numeral 90, and which further has a main body 91 that defines a forwardly facing surface 92 and a rearwardly facing surface 93. Further the main body 91 defines a peripheral edge 94. The main body 91 conformably is dimensioned for mating receipt internally of the housing 60. As best illustrated by reference to FIG. 3 the peripheral edge 94 is disposed in close proximity to the flange 64 of the housing 60. The main body 91 of the coupling plate has formed therein a substantially centrally disposed bore 95 and further has a plurality of orifices disposed in an inwardly disposed pattern 96, and an outwardly disposed pattern 97. These individual orifices are operable to receive fasteners 98 which secure the coupling plate to the first automatic transmission 21 and the second automatic transmission 22 to the coupling plate.

The inwardly disposed pattern of orifices are disposed in registry with the orifices 33 which are formed in the flange 32 and the outwardly disposed pattern are individually disposed in registry with the orifices or threaded channels 63 that are formed in the housing 60 of the second automatic transmission 22. The bore 95 defines a first bore portion 100 and a second bore portion 101 of reduced dimensions. As best seen by reference to FIGS. 3 and 5 a bearing, which is generally indicated by the number 102, has a main body 103 that slideably is received in the second bore portion 101 of the bore 95. The bearing has a centrally disposed bore 104 which conformably is dimensioned closely to house the drive shaft 40. The bearing is held in a predetermined position relative to the second bore portion of the bore by a snap ring 105 which engages the main body 103. As illustrated most clearly by reference to FIG. 2 the bearing is held in place by the forwardly facing surface 67 of the stator plate 66.

As best seen by reference to FIGS. 1 and 2 a transmission fluid conduit, which is generally indicated by the numeral 120, has a first end 121 that is disposed in fluid communication with the pressure testing port 31 which is formed in the housing 23 of the first automatic transmission 21, and further has a second end 122 which is disposed in fluid communication with the test port 65 which is formed in the housing 60 of the second automatic transmission 22. As should be understood, the conduit 120 is operable to provide a fluid communication path for the transmission fluid which is pumped under pressure by the first automatic transmission to the second automatic transmission. In this fashion, the hydraulic fluid pressure generated by the first automatic transmission is operable to actuate the second automatic transmission. The second automatic transmission therefore does not need a hydraulic pump, and as earlier discussed, those subassemblies immediately forward of the stator plate portion 66 are removed from the second automatic transmission. Further a second fluid conduit which is generally indicated by the numeral 123 connects the oil pans 34 in fluid communication. The second conduit 123 has a first end 124 and an opposed second end 125. Each of the automatic transmissions 21 and 22 mounts a manual shift lever hereinafter indicated as a first and second shift lever 131 and 132 respectively. The individual shift levers operate in a conventional manner and permit an operator to selectively activate the two automatic transmissions 21 and 22 to suit any driver preference or driving conditions.

OPERATION

The operation of the described embodiment of the present invention is believed to be readily apparent and is therefore briefly summarized at this point.

As best illustrated by reference to FIG. 2 the transmission assembly 10 includes a first and second automatic transmission 21 and 22 coupled together in series and disposed in driving relation one with the other and with internal combustion engine. The transmission assembly 10 also generally includes a coupling plate 90 that is disposed between the first and second automatic transmissions, the coupling plate mounted on the first automatic transmission, and the second automatic transmission being mounted on the coupling plate. A plurality of orifices are formed in two discreet patterns 96 and 97 in the main body 91 of the coupling plate such that a suitable fastener 98 can be received in the individual threaded bores thereby securing the coupling plate in an appropriate fashion to the second end 25 of the first automatic transmission, and permitting the second automatic transmission to be secured to the coupling plate. These relationships are most clearly illustrated by reference to FIGS. 3 and 4. A drive shaft 40 having first and second ends 41 and 42, is driven by the first automatic transmission and drives the forward clutch 73. Rotation of the drive shaft by the first automatic transmission has the simultaneous effect of driving the forward clutch in the second automatic transmission. As earlier discussed, the enlarged bore portion 70A permits transmission fluid communication between the stator plate 66 and the forward clutch. This relationship is clearly shown by reference to FIG. 3. The stator plate, in turn, is disposed in transmission fluid communication with the first automatic transmission by way of the transmission fluid conduit 120.

As earlier discussed, the present invention includes means for providing pressurized transmission fluid communication between the first and second automatic transmissions, 21 and 22; the preferred embodiment of the subject invention including a transmission fluid conduit 120 which is disposed in fluid communication with the individual test ports 31 and 65 respectively. It should be understood, therefore, that the transmission fluid pressure generated by the first automatic transmission is transmitted to the second automatic transmission thereby eliminating the need for a second hydraulic pump on the second automatic transmission. Each automatic transmission is thereafter selectively actuated by a shift lever, 131 and 132, respectively, in such a fashion so as to impart improved performance characteristics to the internal combustion engine 12 which is so equipped.

Therefore the transmission assembly 10 for enhancing the performance characteristics of an internal combustion engine or the like is adapted for installation and use on a wide variety of differently designed automatic transmissions and is adapted selectively to provide a wide range of gear ratios which may be individually selected by the operator to suit any driving conditions or operator preferences. The transmission assembly is readily removable for maintenance after installation, and can be manufactured as an existing subassembly or readily retrofitted on preexisting transmissions, the transmission assembly being manufactured and installed at a nominal price when compared with other related prior art devices.

Although the invention is been herein shown and described in what is conceived to be the most practical and preferred embodiment, it should be recognized that departures may be made therefrom within the scope of the invention which is not to be limited to the illustrative details disclosed.

Having described my invention what I claim is new and desire to secure by Letters Patent is:

1. A transmission assembly comprising:
   a first automatic transmission having a forward end adapted to be coupled to an internal combustion engine and a rearward end, the first automatic transmission including a drive shaft.
   a second automatic transmission having a forward end and a rearward end, and including a stator plate having a forward portion and a rearward portion, the stator plate located adjacent the forward end of the second automatic transmission, the drive shaft connecting the first automatic transmission in driving relation with the second automatic transmission;
   a coupling plate for connecting the rearward end of the first automatic transmission with the forward end of the second automatic transmission, the coupling plate rotatably supporting the drive shaft; and
   means for providing communication of pressurized transmission fluid between the first and second automatic transmissions.

2. The transmission assembly as set forth in claim 1 wherein the forward end of the second transmission is defined by the stator plate, and the coupling plate is mounted on the rearward end of the first automatic transmission, and the second automatic transmission is mounted on the coupling plate, and the stator plate is disposed immediately adjacent to and rearwardly of the coupling plate.

3. The transmission assembly as set forth in claim 2 wherein the second automatic transmission includes a forward clutch and wherein the drive shaft has a longitudinally extending and centrally disposed passageway formed therein which connects in fluid communication the first automatic transmission with the second automatic transmission; and the drive shaft further has an exterior surface, and forward and rearward ends, the forward end of the drive shaft being driven by the first automatic transmission and the rearward end of the drive shaft drivingly connected to the forward clutch of the second automatic transmission, the stator plate of the second automatic transmission including a transmission fluid passage, and the forward clutch of the second automatic transmission including a transmission fluid passage, and a passageway formed in the bore of the stator plate of the second automatic transmission and providing transmission fluid communication between the transmission fluid passage of the stator plate of the second automatic transmission and the transmission fluid passage of the forward clutch of the second automatic transmission.

4. The transmission assembly as set forth in claim 3 wherein the coupling plate has a main body conformably dimensioned for mating receipt with the forward end of the second transmission, and the main body further defines a substantially centrally disposed bore adapted to house the drive shaft, and a bearing mounted in the centrally disposed bore and rotatably supporting the drive shaft.

5. The transmission assembly as set forth in claim 4 wherein the first automatic transmission and the second automatic transmission each include a transmission fluid pressure test port, and wherein the means for providing communication of pressurized transmission fluid includes a conduit connecting the fluid pressure test port of the first automatic transmission with the fluid pressure test port of the second automatic transmission.

6. The transmission assembly as set forth in claim 1 wherein the first automatic transmission and the second automatic transmission each includes a manual shifting lever, the manual shifting levers being operable to actuate the respective automatic transmissions.

7. The transmission assembly as set forth in claim 1 wherein the first automatic transmission and the second automatic transmission each includes an oil pan, and further including means for linking the oil pans in fluid communication one with the other.

8. A transmission coupling apparatus for serially coupling together first and second automatic transmissions, the first and second automatic transmissions each including a housing with forwardly and rearwardly facing portions, and the second automatic transmission including a forward clutch located in the forwardly facing portion of the second automatic transmission, and a stator plate having forward and rearward portions located in the second automatic transmission forwardly of and in mounting engagement with the forward clutch, said stator plate having a passageway formed therein, the passageway permitting transmission fluid communication between the rearward portion of the stator plate and the forward clutch, the transmission coupling apparatus comprising:

a coupling plate positioned adjacent to the stator plate of the second automatic transmission and disposed between the rearwardly facing portion of the housing of the first automatic transmission and the forwardly facing portion of the housing of the second automatic transmission, the coupling plate mounted on the first automatic transmission and the second automatic transmission mounted on the coupling plate;

a drive shaft having forward and rearward ends, said rearward end dimensioned for mounting engagement with the forward clutch of the second automatic transmission, said drive shaft further being rotatably driven by the first automatic transmission and rotatably supported by the coupling plate, the drive shaft having a longitudinally disposed passageway formed therein, the drive shaft connecting the first automatic transmission in driving relation to the second automatic transmission; and means for providing communication of pressurized transmission fluid between the first and second automatic transmissions.

9. The transmission coupling apparatus as set forth in claim 8 wherein the coupling plate has a main body which is conformably dimensioned for mating receipt with the housing of the second automatic transmission, and the main body of the coupling plate has a centrally disposed bore housing a bearing which is operably rotatably to support the drive shaft.

10. A transmission coupling apparatus for serially coupling together first and second automatic transmissions, said second transmission including a stator plate, and wherein each transmission has a housing with forwardly and rearwardly facing portions, the transmission coupling apparatus comprising:

a coupling plate being disposed between the rearwardly facing portion of the first automatic transmission and the forwardly facing portion of the second automatic transmission, the coupling plate mounted on the first automatic transmission and the second automatic transmission mounted on the coupling plate;

a drive shaft rotatably driven by the first automatic transmission and rotatably supported by the coupling plate, the drive shaft having a longitudinally disposed passageway formed therein, the drive shaft connecting the first automatic transmission in driving relation to the second automatic transmission, and the passageway providing for communication of transmission fluid between the first automatic transmission and the second automatic transmission; and means for providing communication of transmission fluid under pressure between the first and second automatic transmissions.

* * * * *